US011982102B2

(12) United States Patent
Komkin

(10) Patent No.: US 11,982,102 B2
(45) Date of Patent: May 14, 2024

(54) SELF-LOCKING PUSH BUTTON

(71) Applicant: D. LA PORTE SÖHNE GMBH, Wuppertal (DE)

(72) Inventor: Viktor Komkin, Wuppertal (DE)

(73) Assignee: D. LA PORTE SÖHNE GMBH, Wuppertal (DE)

( * ) Notice: Subject to any disclaimer, the term of this patent is extended or adjusted under 35 U.S.C. 154(b) by 520 days.

(21) Appl. No.: 17/264,717

(22) PCT Filed: Jul. 29, 2019

(86) PCT No.: PCT/EP2019/070359
§ 371 (c)(1),
(2) Date: Jan. 29, 2021

(87) PCT Pub. No.: WO2020/025536
PCT Pub. Date: Feb. 6, 2020

(65) Prior Publication Data
US 2021/0310275 A1 Oct. 7, 2021

(30) Foreign Application Priority Data
Jul. 30, 2018 (DE) ......................... 102018212701.8

(51) Int. Cl.

| | |
|---|---|
| ***E05B 11/00*** | (2006.01) |
| ***E05B 13/10*** | (2006.01) |
| ***E05B 15/04*** | (2006.01) |
| ***E05B 85/02*** | (2014.01) |
| ***E05B 85/06*** | (2014.01) |
| ***E05B 85/10*** | (2014.01) |

(52) U.S. Cl.
CPC ............ *E05B 13/105* (2013.01); *E05B 11/00* (2013.01); *E05B 15/04* (2013.01); *E05B 85/02* (2013.01); *E05B 85/06* (2013.01); *E05B 85/10* (2013.01); *E05Y 2900/518* (2013.01); *E05Y 2900/531* (2013.01); *E05Y 2900/536* (2013.01)

(58) Field of Classification Search
CPC .... Y10S 292/37; Y10S 292/38; E05B 13/105; E05B 11/00
USPC ............................................................. 70/91
See application file for complete search history.

(56) References Cited

U.S. PATENT DOCUMENTS

| | | | |
|---|---|---|---|
| 2,871,690 | A | 2/1959 | Johnson |
| 3,604,230 | A | 9/1971 | Tixier |

(Continued)

FOREIGN PATENT DOCUMENTS

| | | | |
|---|---|---|---|
| DE | 874258 | B | 4/1953 |
| DE | 1 064 376 | B | 8/1959 |

(Continued)

OTHER PUBLICATIONS

International Preliminary Report on Patentability of PCT/EP2019/070359 dated Feb. 2, 2021.

(Continued)

*Primary Examiner* — Carlos Lugo
(74) *Attorney, Agent, or Firm* — DICKINSON WRIGHT PLLC

(57) ABSTRACT

The present invention relates to a self-locking pushbutton for unlocking of a lock for a vehicle door, hood, covering or hatch, in particular of an agricultural vehicle, e.g. of a tractor, or of a construction machine.

38 Claims, 16 Drawing Sheets

(56) References Cited

U.S. PATENT DOCUMENTS

| | | | | | |
|---|---|---|---|---|---|
| 4,669,287 | A * | 6/1987 | Reader | E05B 13/105 70/1.5 |
| 5,722,275 | A * | 3/1998 | Price | E05B 13/105 70/379 R |
| 5,732,580 | A * | 3/1998 | Garnault | E05B 17/04 70/419 |
| 6,443,505 | B1 * | 9/2002 | Linares | E05B 17/04 292/195 |
| 6,501,037 | B2 * | 12/2002 | Gressier | H01H 3/022 200/341 |
| 6,782,725 | B2 * | 8/2004 | Linares | E05B 13/105 70/DIG. 37 |
| 8,084,701 | B1 * | 12/2011 | Misner | H01H 27/06 200/566 |
| 8,628,124 | B2 | 1/2014 | Kutschat | |
| 8,756,963 | B2 * | 6/2014 | Le | E05C 1/14 292/DIG. 37 |
| 9,567,780 | B2 | 2/2017 | Behnke et al. | |
| 10,370,868 | B2 | 8/2019 | Komkin | |
| 2008/0271502 | A1 | 11/2008 | Kutschat | |
| 2013/0049378 | A1 | 2/2013 | Kutschat | |
| 2015/0096339 | A1 | 4/2015 | Behnke et al. | |
| 2016/0194902 | A1 | 7/2016 | Komkin | |

FOREIGN PATENT DOCUMENTS

| | | | | |
|---|---|---|---|---|
| DE | 1 936 734 | A1 | 8/1970 | |
| DE | 2818479 | A * | 12/1978 | E05B 11/00 |
| DE | 4316223 | A1 | 11/1993 | |
| DE | 4408910 | A1 | 9/1995 | |
| DE | 102006032257 | A1 | 1/2008 | |
| DE | 202005021438 | U1 | 3/2008 | |
| DE | 102015000213 | A1 | 7/2016 | |
| DE | 102015224218 | A1 | 6/2017 | |
| EP | 2857618 | A2 | 4/2015 | |

OTHER PUBLICATIONS

International Search Report of PCT/EP2019/070359 dated Nov. 7, 2019.

Renault Peugeot, German Publication No. 1 936 734 A1, published Aug. 27, 1970, English Translation of the Claims.

Huelsbeck & Fuerst, German Publication No. 1 064 376 B, published Aug. 27, 1959, English Translation of the Claims.

* cited by examiner

SELF-LOCKING PUSH BUTTON

CROSS-REFERENCE TO RELATED APPLICATIONS

This application is a 35 U.S.C. § 371 national phase of PCT International Application No. PCT/EP2019/070359, filed Jul. 29, 2019, which claims the benefit of priority under 35 U.S.C. § 119 to German Patent Application No. 10 2018 212 701.8, filed Jul. 30, 2018, the contents of which are incorporated herein by reference in their entirety.

FIELD OF THE INVENTION

The present invention relates to a pushbutton for unlocking of a lock for a vehicle door, hood, covering or hatch, in particular of an agricultural vehicle, e.g. of a tractor, or of a construction machine.

BACKGROUND

A vehicle door lock of the above-referenced type is known for example, from DE 10 2006 012 956 A1. This vehicle door lock comprises a rotary latch mechanism with two rotary latches, between which a locking bolt can be accommodated. In a locked position of the vehicle door lock, the rotary latches engage around the locking bolt such that the vehicle door is held in its closed position. The two rotary latches herein are held by two locking pawls in their position holding the locking bolt. Thus the locking pawls lock the rotary latches. This locking can be released by means of an actuation lever. The actuation lever engages in the lock casing. A rotation of the actuation lever causes the locking pawls to release the rotary latches and these subsequently release the locking bolt.

The unlocking of a vehicle door lock, i.e. in the case of DE 10 2006 012 956 A1, the actuation of the actuation lever, can thus occur e.g. by means of a pushbutton or a pull handle. The pushbutton and/or the pull handle respectively, then comprises an actuation mechanism for unlocking of the lock, which in the case of DE 10 2006 012 956 A1 is in connection with the actuation lever. The actuation mechanism therein can be lockable and unlockable, e.g. by means of a cylinder lock. If the actuation mechanism is locked, the lock can no longer be unlocked. This is known per se.

A pushbutton for unlocking of a vehicle door lock of this kind is known, for example, from DE 10 2015 224 218 A1. This pushbutton comprises a cylinder lock with an actuation knob with an actuation knob housing, and also with a cylinder core with platelet tumblers seated therein. By insertion of a corresponding key, the cylinder core can be rotated by means of the key. Thus the pushbutton can be unlocked or unlatched accordingly. Then the pushbutton can be pressed in. If the pushbutton is then released again, it automatically returns—driven by spring force—back into its non-actuated and locked position.

Furthermore, for safety reasons, it has recently become mandatory for example for engine hoods and other coverings or vehicle hatches in accordance with EU Regulation No. 1322/2014 that these can only be opened by means of a tool. This is intended to prevent opening by unauthorized persons. When closing, the hood and/or hatch must lock itself.

This EU Regulation is currently being satisfied, for example, by a vehicle door lock with a rotary latch mechanism according to DE 10 2006 032 257 A1. This vehicle door lock comprises a drive element with a drive profile which can be brought into engagement with a tool. For example, this drive profile pertains to a slot for engaging of a screwdriver and/or to an external or internal hexagon profile. This provides security to the effect that the vehicle door lock cannot be opened by unauthorized persons without a tool, however, no key is needed for opening. If the hood or hatch is closed, the vehicle door lock returns to its initial state in a self-actuating manner.

SUMMARY

The object of the present invention is to provide a pushbutton for unlocking of a lock of a vehicle door, hood, covering or hatch, in particular of an agricultural vehicle, e.g. of a tractor, or of a construction machine, by which the EU Regulation No. 1322/2014 is satisfied and which has a high functional security.

An additional object is to provide a vehicle door, hood, covering or hatch with a pushbutton of this kind.

This object is attained by a pushbutton with the features of claim 1 and by a vehicle door, hood, covering or hatch as described herein.

According to the invention, the pushbutton is designed such that the actuation knob executes an self-actuated reverse stroke from its actuated—that is, its pressed-in-position, into its non-actuated—that is, its not pressed-in—initial position, and the pushbutton additionally returns into its locked position in a self-actuated manner. Thus the actuation knob is locked in a self-actuated manner and/or the pushbutton according to the invention is self-locking. In this case, "in a self-actuated manner" means that the drive occurs purely mechanically and automatically. Thus no manual locking by means of a key occurs. However, the actuation knob can only be unlocked when a corresponding key is inserted into a cylinder lock core of the pushbutton. In addition, the pushbutton according to the invention is designed so that the key inserted into the cylinder lock core of the pushbutton can only be withdrawn when the pushbutton has returned completely into its non-actuated and locked position. Or rather, the key can only be withdrawn in the non-actuated and locked position of the pushbutton.

BRIEF DESCRIPTION OF THE DRAWINGS

The invention will be explained in greater detail below, by way of example, based on a figure. It is shown.

DETAILED DESCRIPTION

Figure 1:
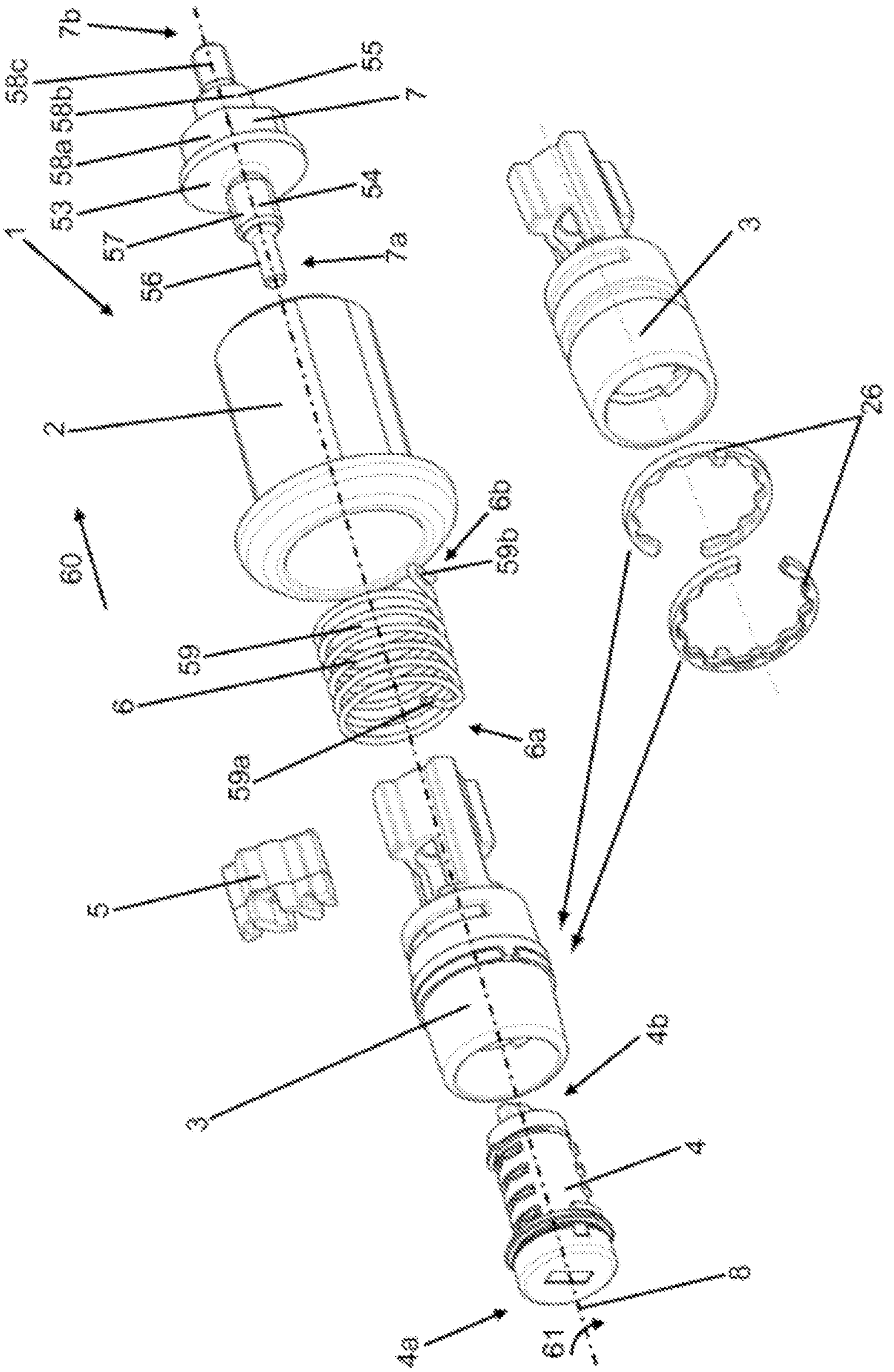
FIG. 1: A perspective, exploded view of the pushbutton according to the invention.
Figure 2:
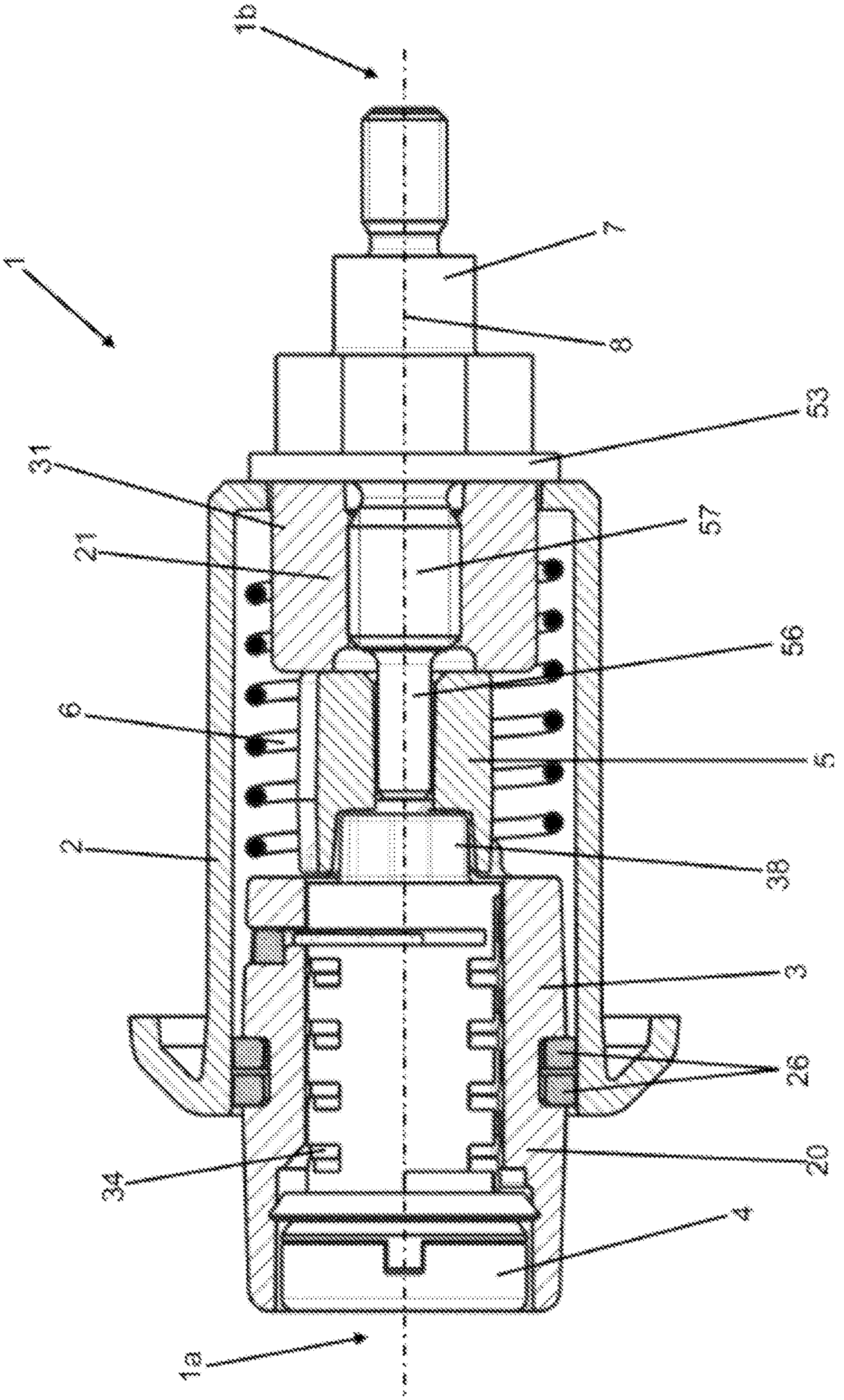
FIG. 2: A first, longitudinal cross section of the pushbutton according to the invention in its locked position.
Figure 3:
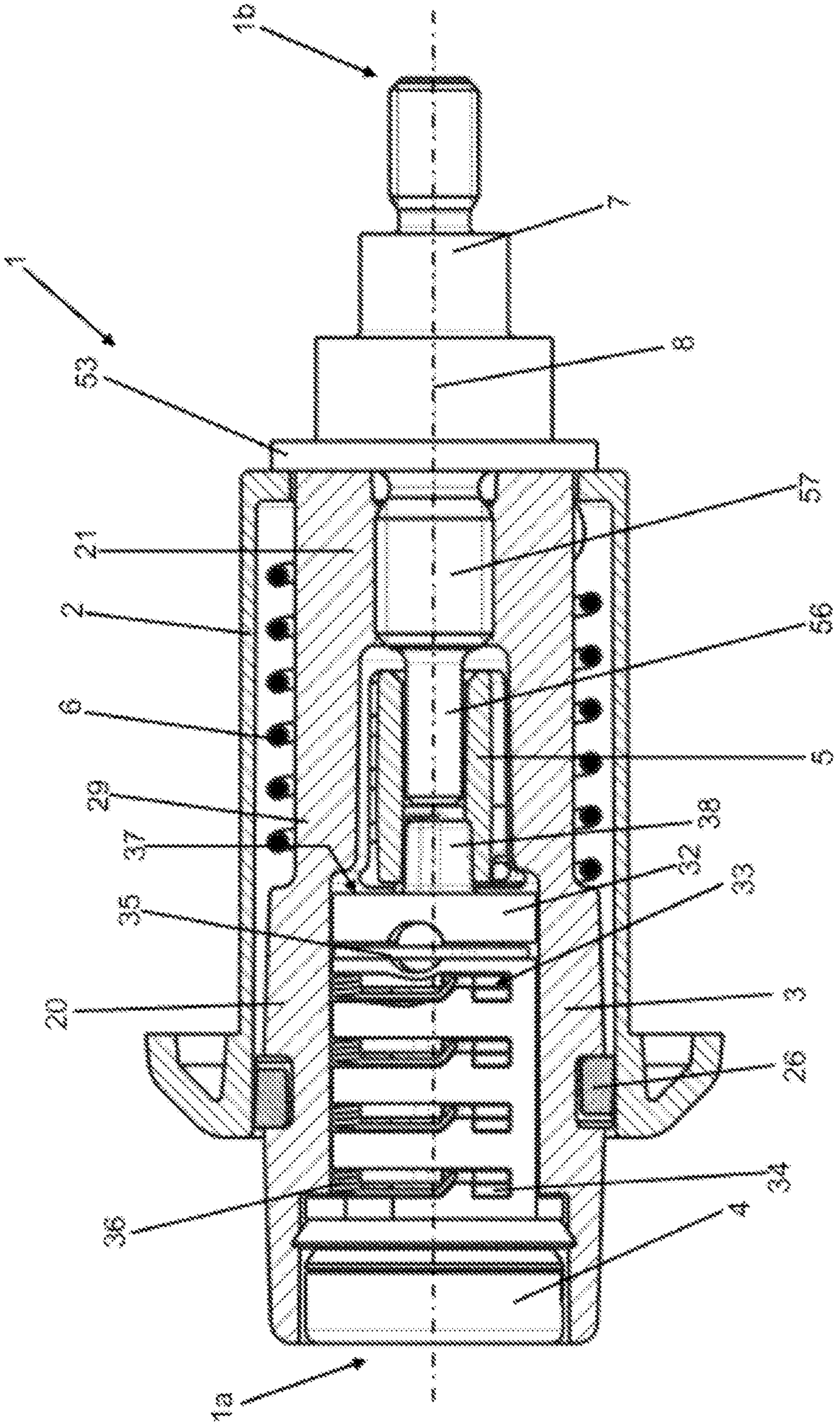
FIG. 3: An additional longitudinal cross section of the pushbutton according to the invention in its locked position.
Figure 4:
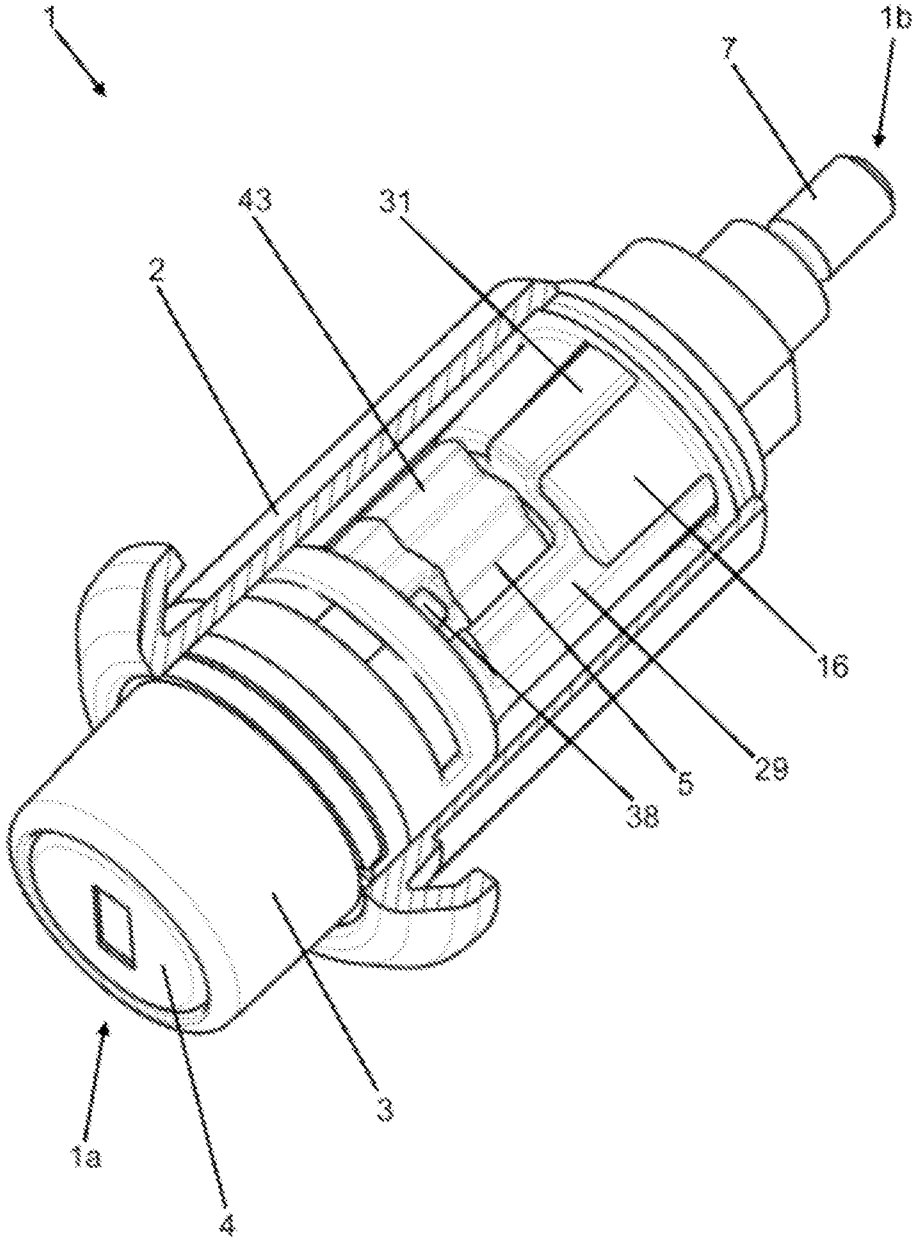
FIG. 4: A perspective view of the pushbutton according to the invention in its locked position, with the pushbutton housing partially cut-away.
Figure 5:
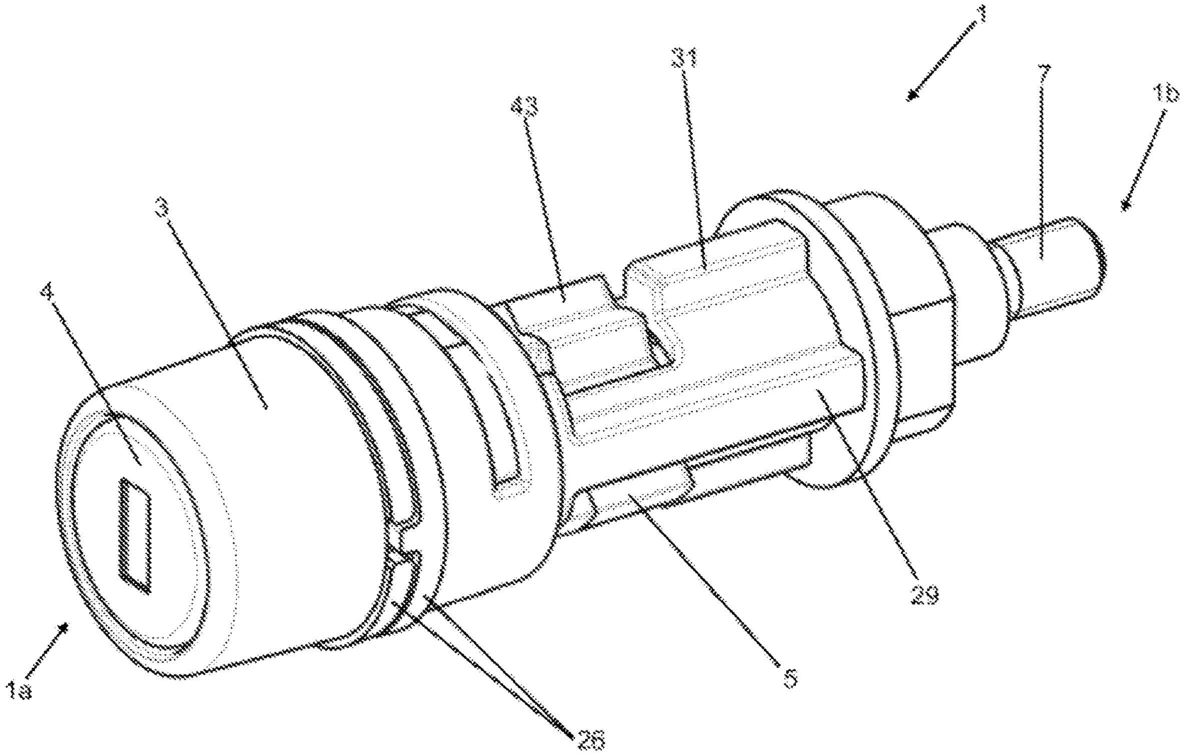
FIG. 5: A perspective view of the pushbutton according to the invention in its locked position, without pushbutton housing without spring.
Figure 6:
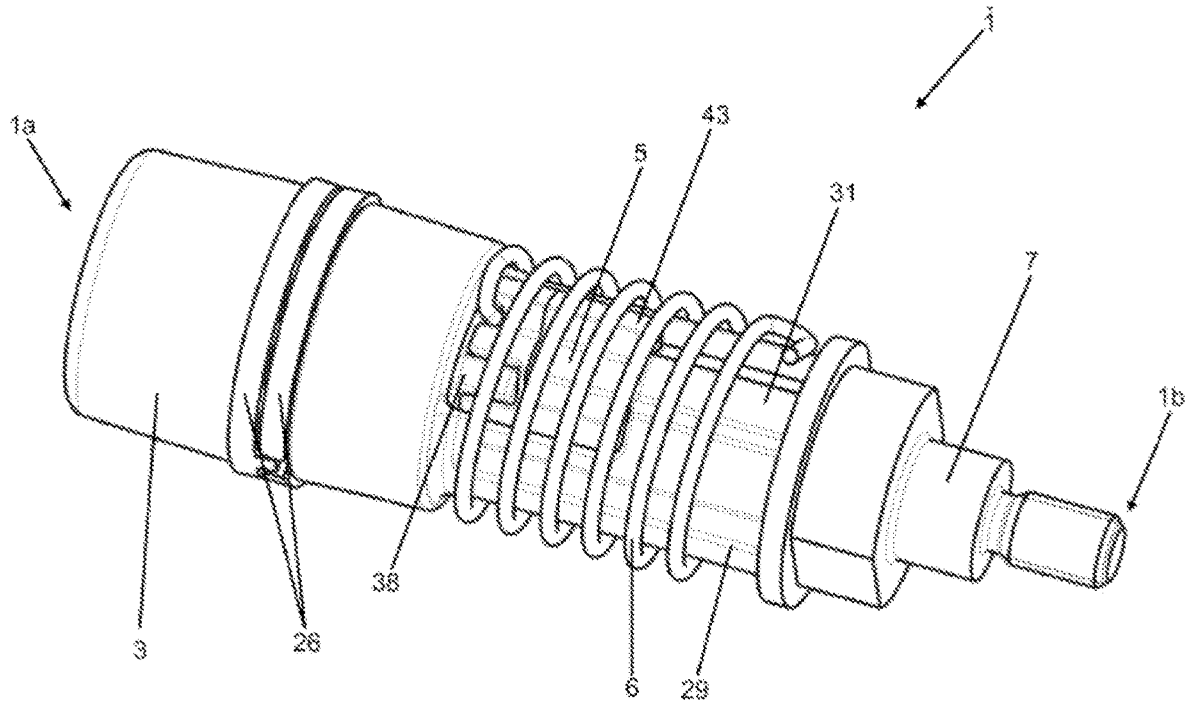
FIG. 6: An additional perspective view of the pushbutton according to the invention in its locked position, without pushbutton housing with spring.

The pushbutton 1 according to the invention (FIGS. 1-9, 16) comprises a pushbutton housing 2, an actuation knob 3 seated therein with a cylinder lock core 4, a latch 5, a spiral compression spring 6, and also a coupling element 7 securely connected to the actuation knob 3. In addition, the pushbutton 1 has a linear actuation axis 8. Viewed in the direction of the actuation axis 8, the pushbutton 1 comprises a first pushbutton end or pushbutton insertion end 1*a* and a second pushbutton end or pushbutton actuation end 1*b*.

Unless stated otherwise, the terms "axial," "coaxial," "in circumferential direction," "radial" or "rotation-symmetrical" hereinafter refer to the actuation axis 8.

The pushbutton housing 2 (FIGS. 1-11) comprises a hollow cylindrical or tubular-shaped housing wall 9 with a housing wall outer surface 9*a* and a housing wall interior surface 9*b*. Viewed in the direction of the actuation axis 8, the pushbutton housing 2 comprises a first housing end or housing insertion end 2*a* and a second housing end or housing actuation end 2*b*. In addition, the pushbutton housing 2 comprises a housing recess 10 extending through the pushbutton housing 2 in the direction of the actuation axis 8.

The pushbutton housing 2 preferably consists of plastic or of metal, particularly preferably pressure-cast metal, preferably of zinc, particularly preferably pressure-cast zinc.

At the first housing end 2*a* the pushbutton housing 2 preferably comprises a circumferential assembly collar 11 protruding radially from the housing wall outer surface 9*a*, which serves as a stop when mounting the pushbutton 1 into the vehicle door, hood or hatch. In addition, the housing wall outer surface 9*a* potentially comprises an external thread 19 for assembly of the pushbutton 1 into the vehicle door, hood or hatch.

At the second housing end 2*b* the pushbutton housing 2 comprises a circumferential, ring-shaped housing bottom 12 extending radially inward from the housing wall interior surface 9*b*. The housing bottom 12 comprises a first interior bottom side 12*a* facing the first housing end 2*a*, and an external bottom side 12*b* arranged opposite thereto in the direction of the actuation axis 8 and facing the second housing end 2*b*.

The pushbutton housing 2 additionally comprises a short tube 13 which is joined to the interior bottom side 12*a* and extends therefrom in the direction of the actuation axis 8. The short tube 13 comprises a tube wall 14 with a tube wall outer surface 14*a* and a tube wall interior surface 14*b*. The short tube 13 is designed to be rotation-symmetrical to the actuation axis 8.

Furthermore, the short tube 13 comprises a fastened tube end and a free tube end opposite thereto in the direction of the actuation axis 8. At the free tube end, the tube wall 14 comprises a tube wall front surface 14*c*.

In addition, the short tube 13 comprises four guide slots 15 which extend from the free tube end, extending parallel to the actuation axis 8 into the short tube 13 and through it. The guide slots 15 also extend through the housing bottom 12. They thus divide the short tube 13 into four tube segments 16 spaced from each other in the circumferential direction. The guide slots 15 each comprise two slot guide surfaces 17 extending parallel to the actuation axis 8 and adjacent to one another in the circumferential direction. The slot guide surfaces 17 are formed on the tube segments 16.

In addition, the pushbutton housing 2 comprises a spring support rib 18 which extends from the inside of the housing bottom 12. The spring support rib 18 serves to support the spiral compression spring 6. It extends between a support segment 16 and the housing wall interior surface 9*b*.

The actuation knob 3 (FIGS. 1-9, 12, 13) comprises a longitudinal extension in the direction of the actuation axis 8. In addition, viewed in the direction of the actuation axis 8, it comprises a first actuation knob end or actuation knob insertion end 3*a* and a second actuation knob end or actuation knob actuation end 3*b*.

The actuation knob 3 preferably consists of metal, particularly preferably pressure-cast metal, preferably of zinc, particularly preferably pressure-cast zinc, or die cast zinc.

In addition, the actuation knob 3 comprises a tubular-shaped actuation knob housing 20 to accommodate the cylinder lock core 4 and also a sleeve 21 and two connecting webs 22.

In a known manner, the actuation knob housing 20 comprises a tubular-shaped cylinder housing wall 23. In addition, the actuation knob housing 20 comprises a through hole 24 extending through the actuation knob housing 20 in the direction of the actuation axis 8. The actuation knob housing 20 additionally comprises a first actuation knob housing end 20*a* and a second actuation knob housing end 20*b* opposite to the first actuation knob housing end 20*a* in the direction of the actuation axis 8.

Preferably, the cylinder housing wall 23 additionally comprises a sealing ring receiving groove 25 which extends in the circumferential direction and is open toward the outside. The sealing ring receiving groove 25 serves in a manner known per se to receive sealing and guide rings 26. A slot 27 serves in a manner known per se to receive a securing device which additionally radially limits an assembly tumbler or locking tumbler.

The two connecting webs 22 serve to connect the sleeve 21 to the actuation knob housing 20. When viewed with respect to the actuation axis 8, they are arranged radially opposite each other. Furthermore, the two connecting webs 22 are preferably formed in the shape of a cylindrical tube segment and comprise a web outer surface 22*a* and a web interior surface 22*b*. At the second actuation knob housing end 20*b* the connecting webs 22 connect to the second actuation knob housing 20 and extend away from the actuation knob housing 20 in the direction of the actuation axis 8.

At the second actuation knob housing end 20*b* the connecting webs 22 additionally preferably comprise a broadened web base 28. The web bases 28 each have an extension in the circumferential direction and, when viewed from the web outer surface 22*a*, in the radial direction outwardly with respect to the actuation axis 8. In addition, they each comprise preferably two side web base surfaces 28*a*. The web base surfaces 28*a* limit the web bases 28 in the circumferential direction.

In addition, the two connecting webs 22 each comprise a first guide strip 29 extending in a radial direction away from the web outer surface 22*a*. The guide strips 29 have a longitudinal extension parallel to the actuation axis 8. They extend toward the sleeve 21 and are also formed to it, which will be described in more detail below.

The cylindrical sleeve 21 comprises a sleeve wall 30 with a sleeve wall outer surface 30*a* and a sleeve wall interior surface 30*b* and also two sleeve wall front surfaces 30*c*. Furthermore, the sleeve 21 comprises a sleeve recess 21*a* extending through the sleeve 21 in the direction of the actuation axis 8. The sleeve recess 21*a* preferably comprises an internal thread.

As already explained, the guide strips 29 extend toward and along the sleeve 21 and are also integrally formed thereon. In particular they are integrally formed on the sleeve wall outer surface 30*a* and protrude therefrom in the radial direction.

The first guide strips 29 each have a free strip front surface 29*a* facing the second actuation knob end 3*b*, and also two strip side surfaces 29*b* spaced apart from each other in the circumferential direction and an outer strip circumferential surface 29*c*. The strip front surface 29*a* preferably fits flush against the sleeve wall front surface 30*c* arranged on the second actuation knob end 3*b*. Furthermore, the strip front surface 29*a* is preferably perpendicular to the actuation axis 8. The strip circumferential surface 29*c* is preferably formed as a circular cylinder. The two strip side surfaces 29*b* are preferably parallel to each other and parallel to the actuation axis 8.

The sleeve 21 further comprises two second guide strips 31 which are also formed onto the sleeve wall outer surface 30*a* and extend therefrom in a radial direction. The second guide strips 31 also extend in the axial direction. In addition, they are preferably arranged opposite to each other in the radial direction. One second guide strip 31 each is also arranged between the two first guide strips 29.

The two second guide strips 31 further each comprise two free strip front surfaces 31*a;b* and also two strip side surfaces 31*c* spaced from each other in the circumferential direction, and an outer strip circumferential surface 31*d*.

The first strip front surface 31*a* facing the first actuation knob end 3*a* preferably fits flush against the tube wall front surface 14*c*. And the second strip front surface 31*b* facing the second actuation knob end 3*b* preferably fits flush against the sleeve wall front surface 30*c* arranged on the second actuation knob end 3*b* or respectively against the strip front surfaces 29*a* of the first guide strips 29.

In addition, the strip front surfaces 31*a;b* are preferably perpendicular to the actuation axis 8. The strip circumferential surface 31*d* is preferably formed as a circular cylinder. The two strip side surfaces 31*c* are preferably parallel to each other and parallel to the actuation axis 8.

As already explained, the actuation knob housing 20 serves to accommodate the cylinder lock core 4.

The cylinder lock core 4 preferably consists of metal, particularly preferably pressure-cast metal, preferably of zinc, particularly preferably pressure-cast zinc.

The cylinder lock core 4 (FIGS. 1-4) has a first cylinder core end or cylinder core insertion end 4*a* and a cylinder core end or cylinder actuation end 4*b* positioned opposite thereto in the direction of the actuation axis 8. In addition, the cylinder lock core 4 comprises a, in particular cylindrical, core body 32 with a preferably circular-cylindrical body outer surface. The cylinder lock core 4 additionally comprises a key channel extending in a known manner parallel to the actuation axis 8 from the first cylinder core end 4*a* into the cylinder lock core 4, in particular the core body 32, and platelet guide slots 33 extending perpendicular thereto and penetrating the cylinder lock core 4, in particular the core body 32. The platelet guide slots 33 are arranged adjacent to one another in the axial direction. In each platelet guide slot 33, there are preferably two spring-loaded platelet tumblers 34 arranged. In addition, a locking tumbler 35 is arranged in another guide slot, which serves in a known manner such that the cylinder core 4 is seated axially immovable in the actuation knob housing 20.

If no corresponding key has been inserted into the cylinder lock core 4, then the platelet tumblers 34 are pressed by springs 36 into radially opposing locking grooves (not illustrated) of the actuation knob housing 20, so that the cylinder lock core 4 in the actuation knob housing 20 cannot be rotated about the actuation axis 8. If a corresponding key is inserted, the platelet tumblers 34 are drawn into the cylinder lock core 4 so that the cylinder lock core 4 can be rotated about the actuation axis 8 in the actuation knob housing 20. This is known per se. In this connection, the locking mechanism can also be designed differently. Preferably, the locking mechanism is designed according to German patent application DE 10 2015 000 213 A1.

The core body 32 further has a core front surface 37 at the second cylinder core end 4*b*, which is preferably perpendicular to the actuation axis 8.

In addition, the cylinder lock core 4 has an actuation segment 38, preferably in the form of a strip, which extends from the core front surface 37 in the direction of the actuation axis 8. The actuation segment 38 is preferably formed elongated and has a central section of circular cross section, the central axis of which is preferably coaxial to the actuation axis 8. It preferably has a longitudinal extension perpendicular to the actuation axis 8.

The latch 5 (FIGS. 1-9, 14, 15) or rather the locking element 5 comprises a socket-shaped or sleeve-shaped middle section 39 with a socket recess 40 extending through the middle section 39 in the axial direction. A central axis of the socket recess 40 is preferably parallel, particularly preferably coaxial, to the actuation axis 8. Furthermore, the latch 5 has a first latch end 5*a* facing the pushbutton insertion end 1a and a latch end 5*b* opposite thereto in the axial direction and facing the pushbutton actuation end 1*b*.

A latch wall 41 comprises a latch wall outer surface 41*a* and two latch wall front surfaces 41*b* opposing in the axial direction. The latch wall outer surface 41*a* is arranged around the actuation axis 8. The two latch wall front surfaces 41*b* are preferably planar and perpendicular to the actuation axis 8.

The latch 5 preferably consists of metal, particularly preferably pressure-cast metal, preferably of zinc, particularly preferably pressure-cast zinc, or of die cast zinc.

In addition, the latch 5 comprises two cylindrical stops 42, which adjoin the sleeve-shaped middle section 39 externally and extend therefrom in the radial direction. The cylindrical stops 42 each have a circular cylindrical stop outer surface 42*a*. In addition, they are opposite each other in the radial direction. They serve as a stop for the actuation knob 3 in an unlocked position of the pushbutton 1, which will be explained in more detail below.

In addition, the latch 5 comprises two locking strips 43, which each adjoin one of the cylindrical stops 42 externally and extend therefrom in the radial direction. The two locking strips 43 are opposite each other in the radial direction.

The two locking strips 43 also each have two free locking strip front surfaces 43*a;b* as well as two locking strip side surfaces 43*c* spaced from each other in the circumferential direction and an outer locking strip circumferential surface 43*d*.

In addition, the locking strip front surfaces 43*a;b* are preferably perpendicular to the actuation axis 8. The locking strip circumferential surface 43*d* is preferably formed as a circular cylinder. The two locking strip side surfaces 43*c* are preferably parallel to each other and parallel to the actuation axis 8.

The latch 5 additionally has at least one, preferably two, spring receiving grooves 44, which extend into the latch 5 when viewed from the first latch end 5*a*. In addition, they extend through the latch 5 in a direction perpendicular to the actuation axis 8. The two spring receiving grooves 44 further preferably extend parallel to each other. Furthermore, they preferably extend inclined with respect to the locking strip side surfaces 43*c*. If two spring receiving grooves 44 are present, this simplifies the assembly, since no care need be given to the alignment of the latch 5.

Moreover, the latch 5 has an actuation segment receiving groove 45 for receiving the actuation segment 38. The actuation segment receiving groove 45 likewise extends into the latch 5 when viewed from the first latch end 5*a*. In addition, it also extends through the latch 5 in a direction perpendicular to the actuation axis 8. Preferably, it also extends parallel to the spring receiving grooves 44.

The actuation segment receiving groove 45 is bounded by two groove side surfaces 45*a* and a groove bottom surface 45*b*. The groove bottom surface 45*b* is preferably perpendicular to the actuation axis 8. The two groove side surfaces 45*a* are opposite each other in the radial direction. In addition, they each have a central surface section 46 which is formed circular cylindrical, wherein a rotation axis of the surface section 46 is preferably coaxial to the actuation axis 8. The two groove side surfaces 45*a* each additionally have two planar surface sections 47;48, which are preferably parallel to the actuation axis 8. The planar surface sections 47;48 of the two groove side surfaces 45*a* are preferably parallel to each other.

Figure 16:
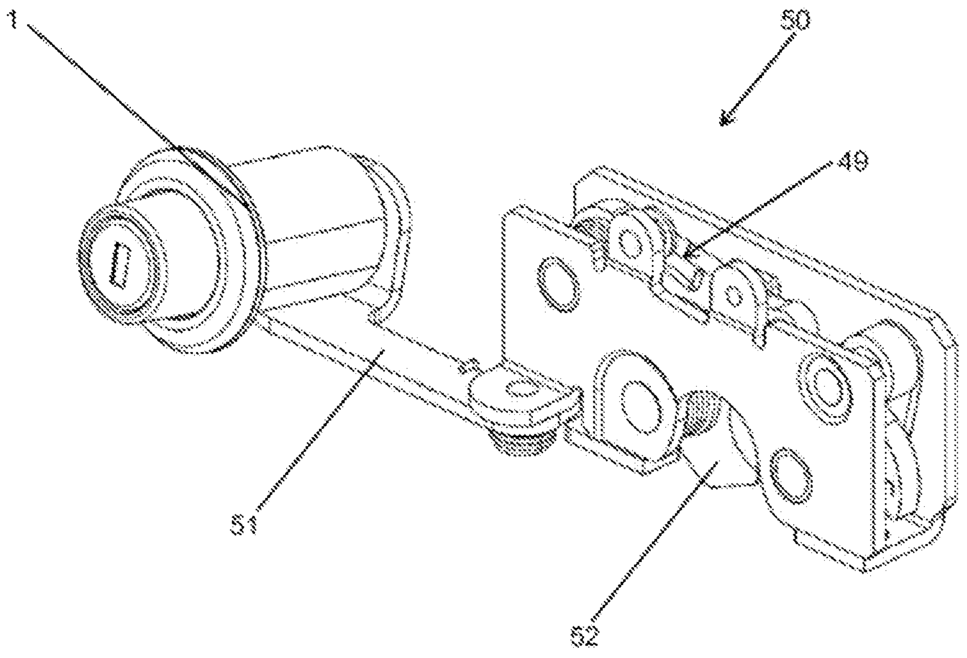
FIG. 16: A perspective view of a pushbutton linked with a rotary latch lock.

The coupling element 7 is used for connecting the pushbutton 1 to the actuation mechanism 49 of a lock 50 (FIG. 16). In particular, the coupling element 7 is used for connecting to a respective corresponding coupling element 51 of the lock mechanism, which is arranged outside of the pushbutton housing 2. The lock 50 is preferably a rotary latch lock with at least one rotary latch 52.

When viewed in the direction of the actuation axis 8, the coupling element 7 has a first coupling element end 7*a* and a second coupling element end 7*b* opposite thereto. The coupling element 7 is securely connected to the actuation knob 3 at the first coupling element end 7*a*. The second coupling element end 7*b* is used for connecting the coupling element 7 to the actuation mechanism 49 of the lock 50.

The coupling element 7 (FIG. 1) comprises a base plate 53 and two connecting tubes 54;55. The first connecting tube 54 extends away from the base plate 53 or protrudes therefrom in the direction of the first coupling element end 7*a*. The second connecting tube 55 protrudes from the base plate 53 in the direction of the second coupling element end 7*b*.

The first, preferably stepped, connecting tube 54 has a circular cylindrical pin 56 at its free end. At its connected end, the first connecting tube 54 has a circular cylindrical tube section 57 with an external thread. The pin 56 has a smaller outer diameter than the circular cylindrical tube section 57.

The second connecting tube 55 is preferably also stepped and preferably has three tube sections 58*a; b;c,* the outer diameter of which gradually decreases towards the second coupling element end 7*b*. The tube section 58*c* arranged at the free end in addition preferably has an external thread for connecting to the actuation mechanism 49.

As already explained, the pushbutton 1 additionally has the spiral compression spring 6.

In the case of a coiled torsion spring the primary direction of load runs in the direction of the spring axis, wherein the spring ends can be twisted slightly against each other. The cross section of the wire is subjected to torsion when loaded. Depending on the external load, a distinction is made between tension and compression springs.

A leg spring is a coil spring which is subjected to bending about its axis. Thus a torque is introduced.

The spiral compression spring 6 is subjected to both compression and bending.

The spiral compression spring 6 has a spring axis coaxial to the actuation axis 8 as well as a first and a second spring end 6*a*;6*b* when viewed in the direction of the actuation axis 8. In addition, the spiral compression spring 6 has a screw winding 59 made of spring wire with two bent over spring wire ends 59*a*;59*b*. The spring wire ends 59*a*;59*b* preferably extend perpendicular to the actuation axis 8.

The spiral compression spring 6 preferably consists of metal or plastic.

The mode of operation of the pushbutton 1 according to the invention will now be explained below:

In the assembled, locked state of the pushbutton 1 according to the invention (FIGS. 2-6, 8), the actuation knob 3 is initially immovably mounted inside the pushbutton housing 2 in the direction of the actuation axis 8. At the first pushbutton end 1*a* the actuation knob 3 extends from the pushbutton housing 2. The sealing and guide rings 26 are arranged in the sealing ring receiving groove 25 and rest against the housing wall interior surface 9*b* of the housing wall 9 of the pushbutton housing 2 so that they can slide back and forth in the direction of actuation axis 8.

In addition, the first and second guide strips 29;31 of the actuation knob 3 are arranged within the guide slots 15 of the pushbutton housing 2. The two guide strip side surfaces 29*b*;31*c* herein each rest against the slot guide surfaces 17. As a result, the actuation knob 3 is connected to the pushbutton housing 2 in a manner that it cannot rotate about the actuation axis 8.

The cylinder lock core 4 is arranged inside of the actuation knob housing 20 in a manner known per se. The actuation segment 38 of the cylinder lock core 4 herein extends from the actuation knob housing 20. In the direction of the actuation axis 8, the cylinder lock core 4 is connected to the actuation knob housing 20 by means of the locking tumbler 35 in a non-displaceable manner.

As long as a corresponding key has not been inserted into the cylinder lock core 4, the cylinder lock core 4 additionally is connected to the actuation knob housing 20 so that it cannot rotate about the actuation axis 8, since the platelet tumblers 34 are arranged within the locking grooves of the actuation knob housing 20. Thus, the pushbutton 1 is locked or locked up.

Figure 8:
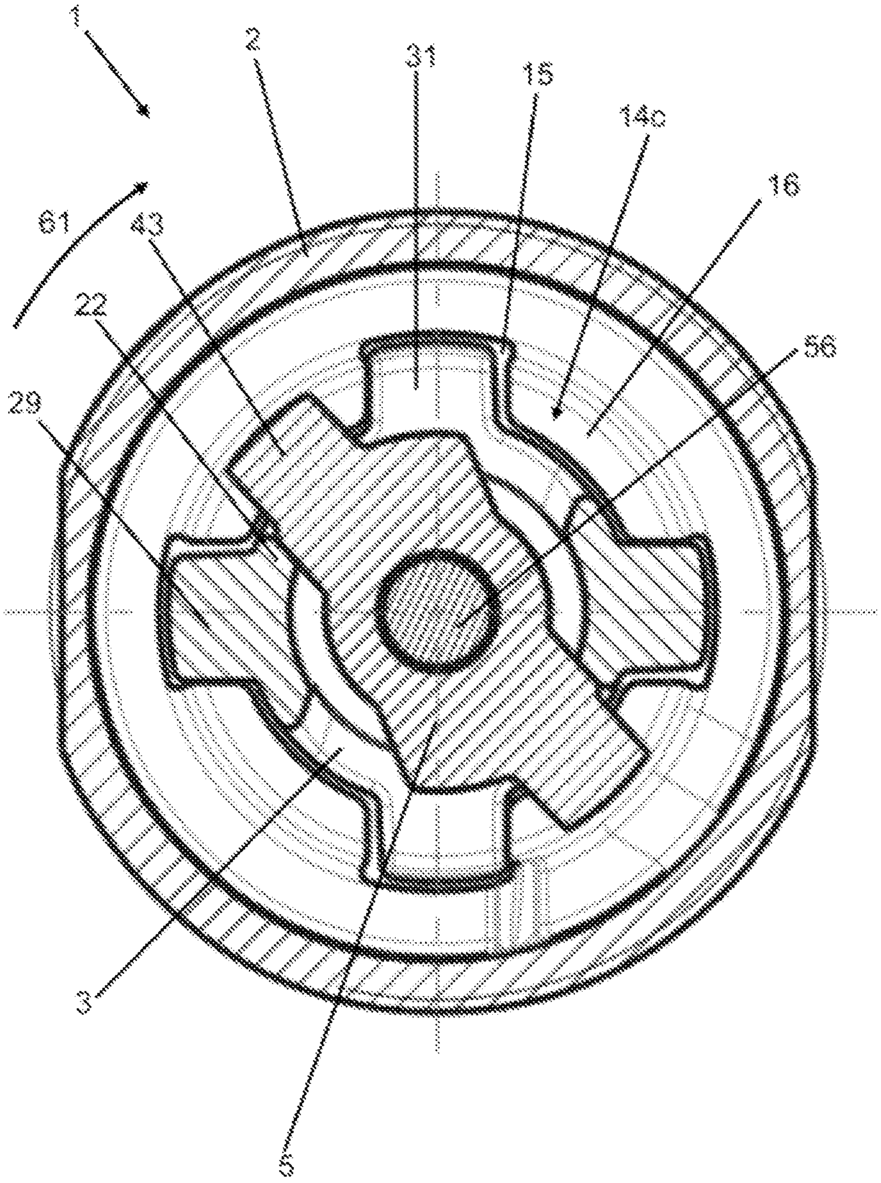
FIG. 8: A cross section through the pushbutton according to the invention in its locked position.

The latch 5 is arranged between the actuation knob housing 20 and the sleeve 21. In addition, when viewed in the radial direction, it is arranged between the two connecting webs 22. It also rests with the two stops 42 against the two connecting webs 22 (FIG. 8).

In addition, the actuation segment 38 of the cylinder lock core 4 is arranged in the actuation segment receiving groove 45 of the latch 5 in a positive locking manner. Thus, the latch 5 is connected to the cylinder lock core 4 so that it cannot rotate about the actuation axis 8. Or rather, the latch 5 is connected to the cylinder lock core 4 so that it can be driven about the actuation axis 8.

In the locked, non-actuated position of the pushbutton 1, the latch 5 is additionally rotated with respect to the sleeve 1 such that the latch locking strips 43 are rotated with respect to the second guide strips 31 of the sleeve 21. The latch locking strips 43 and the second guide strips 31 are not arranged in alignment with each other in the axial direction. In addition, the latch locking strips 43 are not arranged in alignment with the guide slots 15, but in alignment with the tube segments 16 of the pushbutton housing 2. The latch locking strips 43 preferably rest with the second latch locking strip front surfaces 43*b* against the tube wall front surface 14*c*. Thus, the movement of the actuation knob 3 in a linear, pushbutton actuation direction 60 parallel to the actuation axis 8 is blocked. The actuation knob 3 cannot be pressed into the pushbutton housing 2, or it cannot be pressed or operated. The tube wall front surface 14*c* or rather the tube segments 16 act as abutments for the movement of the actuation knob 3 in the pushbutton actuation direction 60.

The spiral compression spring 6 is also arranged inside of the pushbutton housing 2. In particular, the second spring end 6*b* of the spiral compression spring 6 rests against the pushbutton housing 2, preferably against the spring support rib 18 and in the axial direction against the inside of the housing bottom 12.

In addition, the spiral compression spring 6 is arranged around the sleeve 21 and the connecting webs 22 of the actuation knob 3 and around the latch 5. Thus, the spiral compression spring 6 is supported at its first spring end 6*a* on the latch 5. It is arranged in particular at its first spring end 6*a* in one of the two spring receiving grooves 44 of the latch 5. In addition, it is supported in the axial direction at its first spring end 6*a* against the actuation knob housing 20.

The spiral compression spring 6 is thus clamped between the actuation knob 3 and the pushbutton housing 2 parallel to the actuation axis 8 and pushes the actuation knob 3 and the pushbutton housing 2 apart. Or rather, the actuation knob 3 is connected to the spiral compression spring 6 in a drivable manner opposite to the linear pushbutton actuation direction 60 relative to the pushbutton housing 2. Or rather, the spiral compression spring 6 pushes the actuation knob 3 out of the pushbutton housing 2.

In addition, as mentioned, the first spring wire end 59*a* of the spiral compression spring 6 is arranged within the spring receiving groove 44 of the latch 5, and the second spring wire end 59*b* is supported on the spring support rib 18 of the pushbutton housing 2. Thus, the latch 5 can be rotated about the actuation axis 8 relative to the pushbutton housing 2 in an unlocking direction 61 only opposite to the force of the spiral compression spring 6. The spiral compression spring 6 herein is preferably pretensioned in the locked state of the pushbutton 1. It is thus also pretensioned in a direction around the spring axis. Thus, the latch 5 and, via this, the cylinder lock core 4, is drivably connected with the spiral compression spring 6 against the unlocking direction 61 relative to the pushbutton housing 2 into its locking or locked position. Or rather, the spiral compression spring 6 pushes the latch 5 into its locking or locked position. The two connecting webs 22 herein act as abutments for the rotational movement of the latch 5 opposite to the unlocking direction 61.

At the second pushbutton end 1*b*, the first connecting tube 54 is screwed with the cylindrical tube section 57 into the internal thread of the sleeve recess 21*a* of the sleeve 21. Thus, the coupling element 7 is securely connected to the actuation knob 3. Here, the base plate 53 rests on the outside of the pushbutton housing 2. Thus, the movement of the actuation knob 3 opposite to the pushbutton actuation direction 60 is also blocked. The actuation knob 3 cannot be displaced parallel to the actuation axis 8 relative to the pushbutton housing 2.

The pin 56 of the first connection tube 54 is additionally arranged in the socket recess 40 of the latch 5 in a positive-locking manner. Thus, the latch 5 is rotatably mounted on the pin 56 about the actuation axis 8.

In summary, in the locked and not unlockable, or rather locked up state of the pushbutton 1, that is, as long as no corresponding key has been inserted into the cylinder lock core 4, then the cylinder lock core 4, the actuation knob 3, the latch 5 and the pushbutton housing 2 cannot be rotated relative to each other about the actuation axis 8. In addition, the actuation knob 3 also cannot be pressed into the pushbutton housing 2 in the pushbutton actuation direction 60, that is to say it cannot be actuated. Also, it cannot be moved opposite the pushbutton actuation direction 60 relative to the pushbutton housing 2. Actuation knob 3 and pushbutton housing 2 in the locked state are securely connected to one another, or rather are locked to each other.

For opening up or unlocking the pushbutton 1, a corresponding key is now inserted into the cylinder lock core 4 in the pushbutton actuation direction 60. Thus, the platelet tumblers 34 are drawn out of the locking grooves of the actuation knob 3 into the interior of the cylinder lock core 4. Thus, the cylinder lock core 4 is opened up or unlocked or unlockable. Because now the cylinder lock core 4 can be rotated into the unlocking direction 61 relative to the actuation knob 3 by means of the key.

Since the latch 5 is connected non-rotatably about the actuation axis 8 to the cylinder lock core 4 via the actuation segment 38, the rotation of the cylinder lock core 4 will cause the latch 5 to also rotate.

Figure 9:
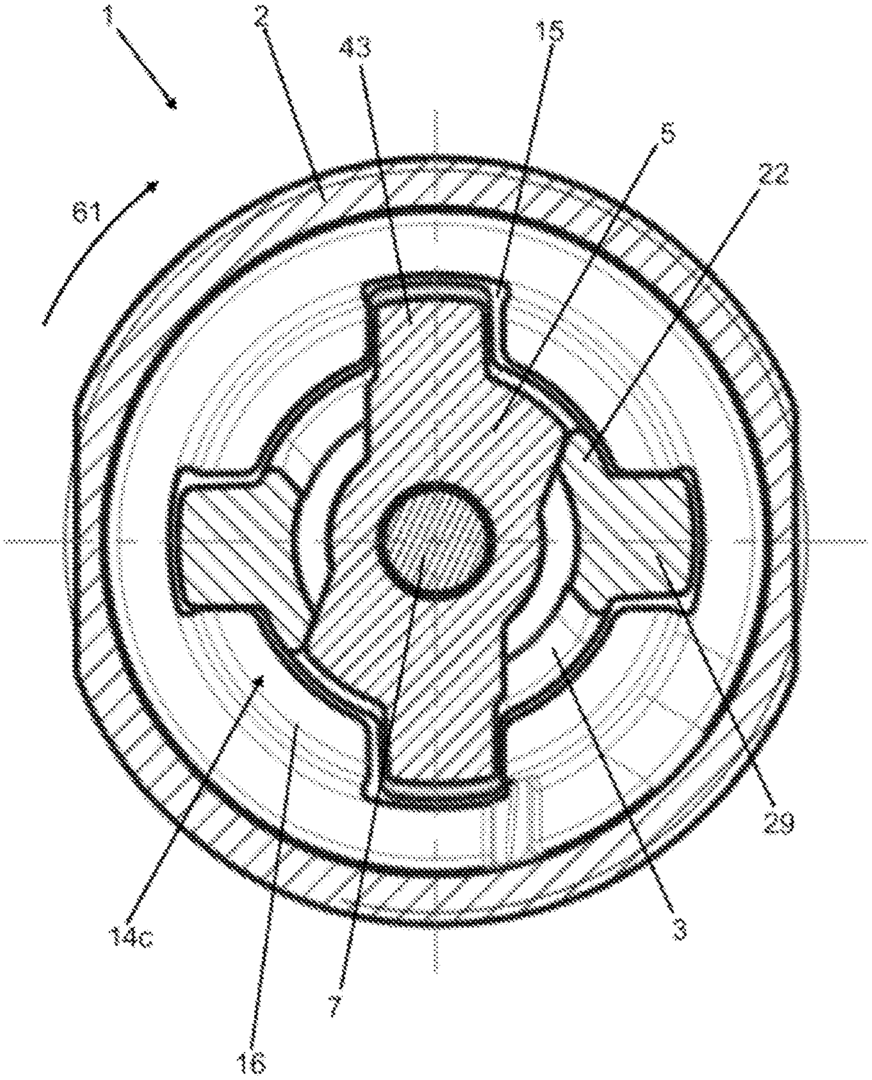
FIG. 9: A cross section through the pushbutton according to the invention in its unlocked position.
Figure 10:
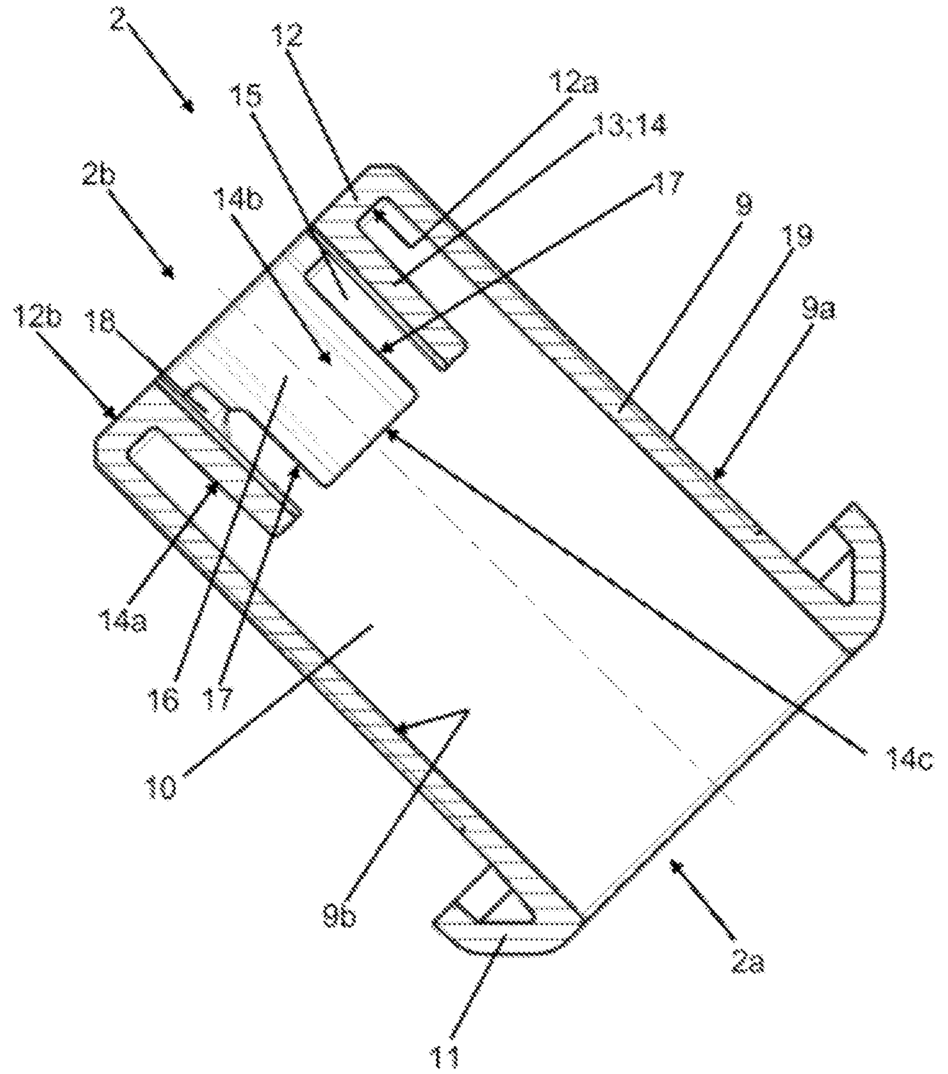
FIG. 10: A longitudinal cross section through the pushbutton housing of the pushbutton.
Figure 11:
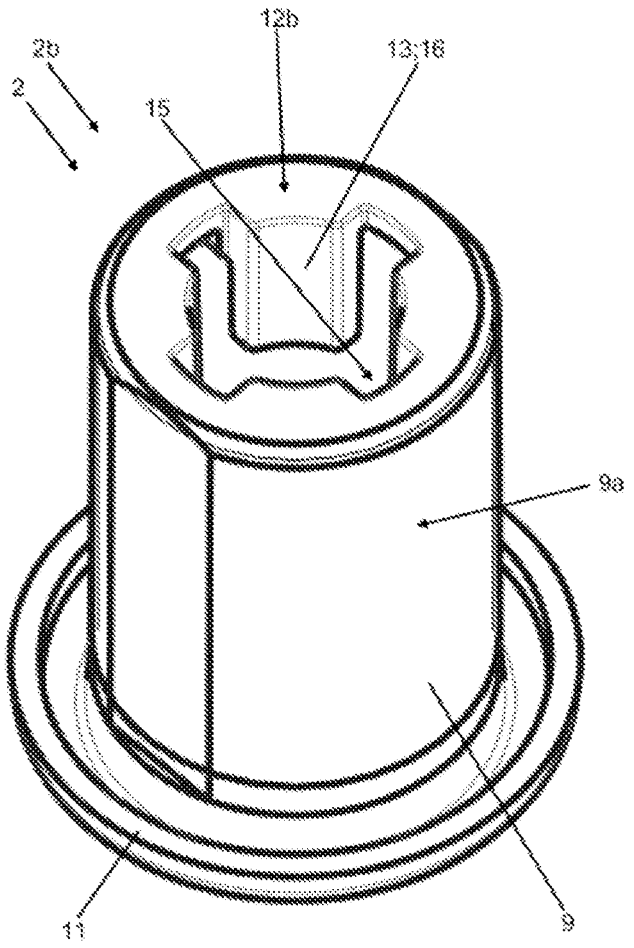
FIG. 11: A perspective top view of the pushbutton housing from a second pushbutton housing end.
Figure 12:
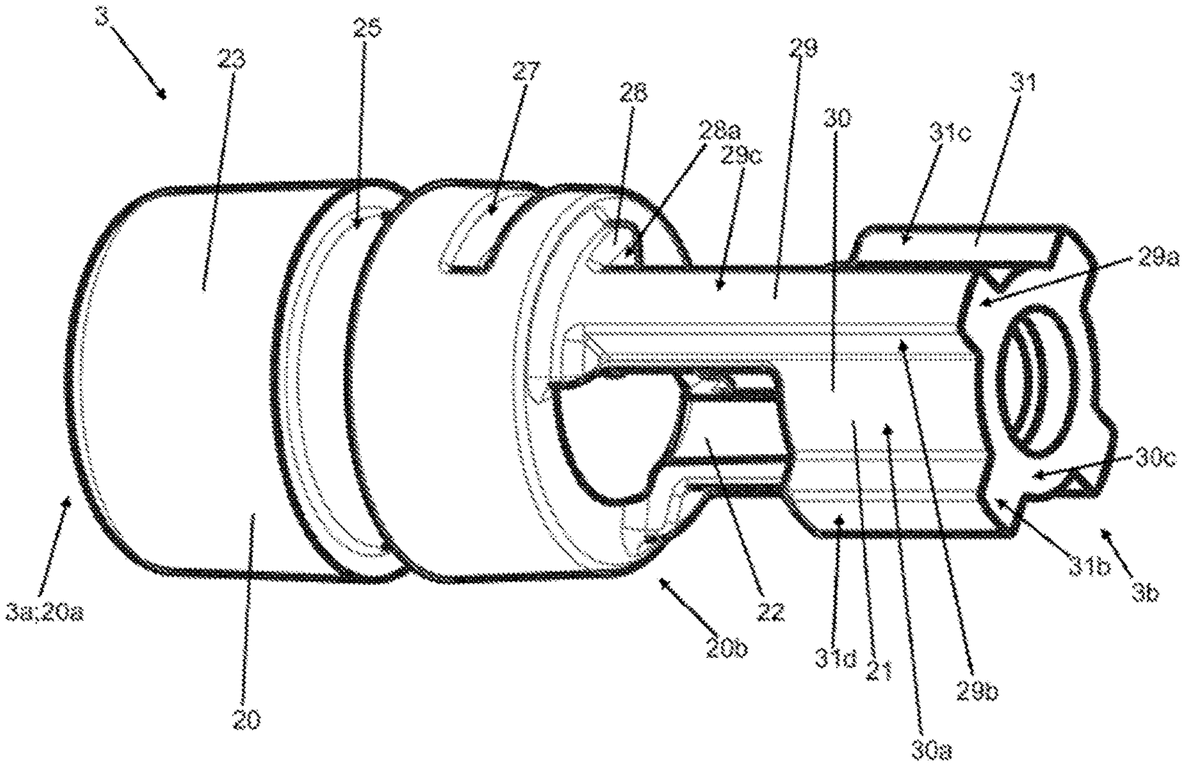
FIG. 12: A perspective view of an actuation knob of the pushbutton according to the invention.
Figure 13:
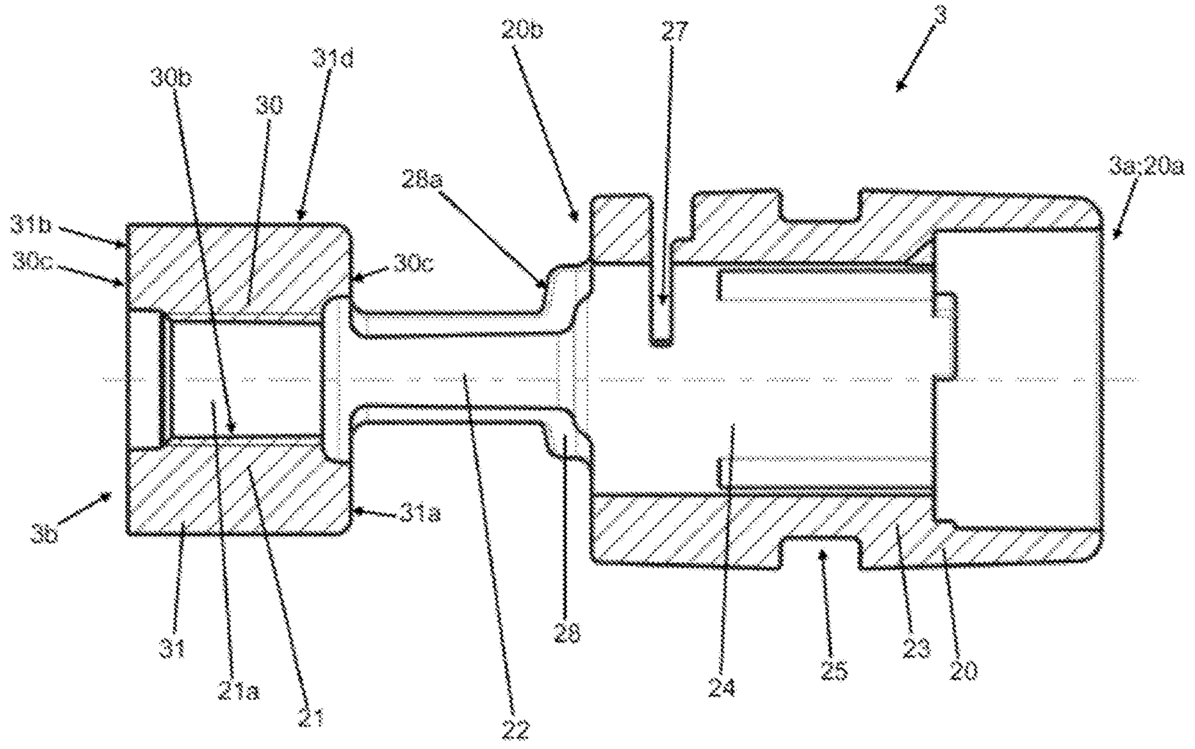
FIG. 13: A longitudinal cross section through the actuation knob.
Figure 14:
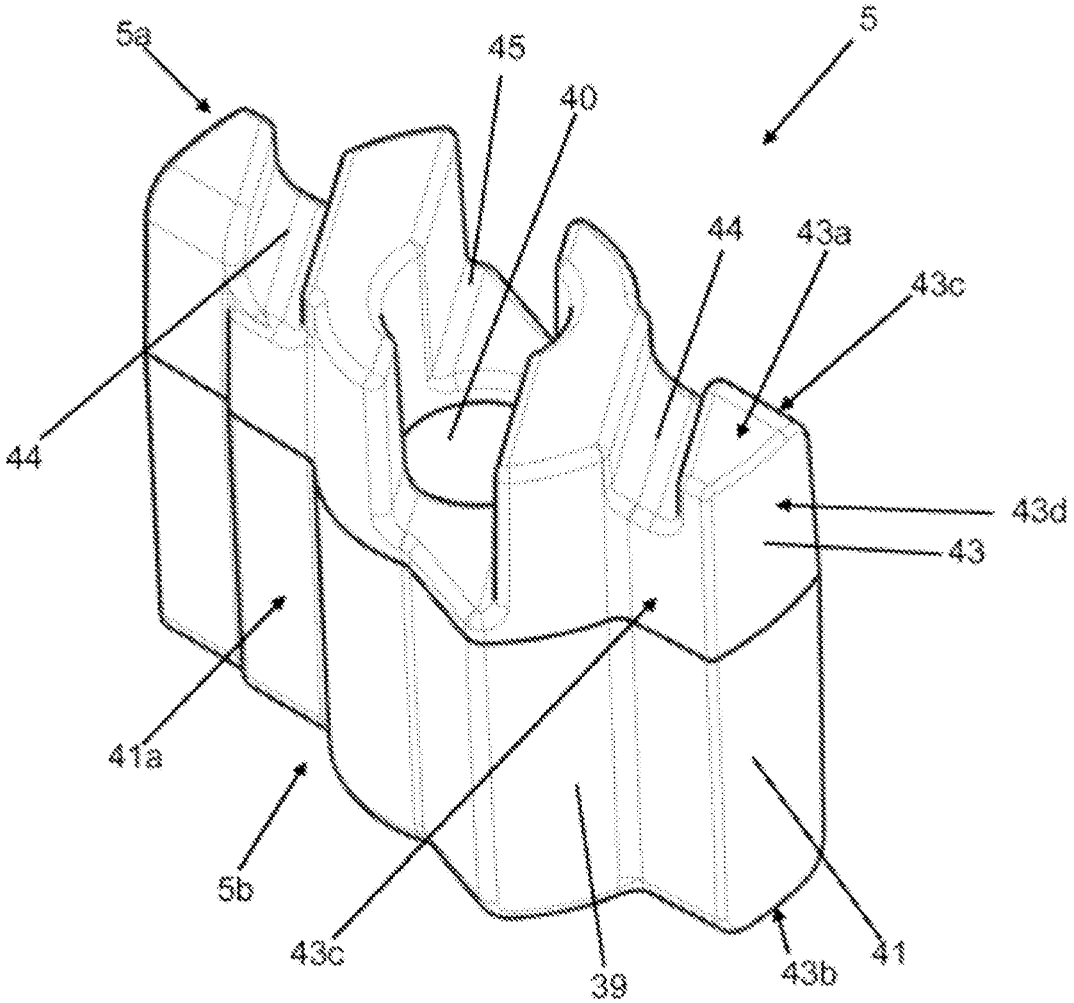
FIG. 14: A perspective view of a latch of the pushbutton according to the invention.
Figure 15:
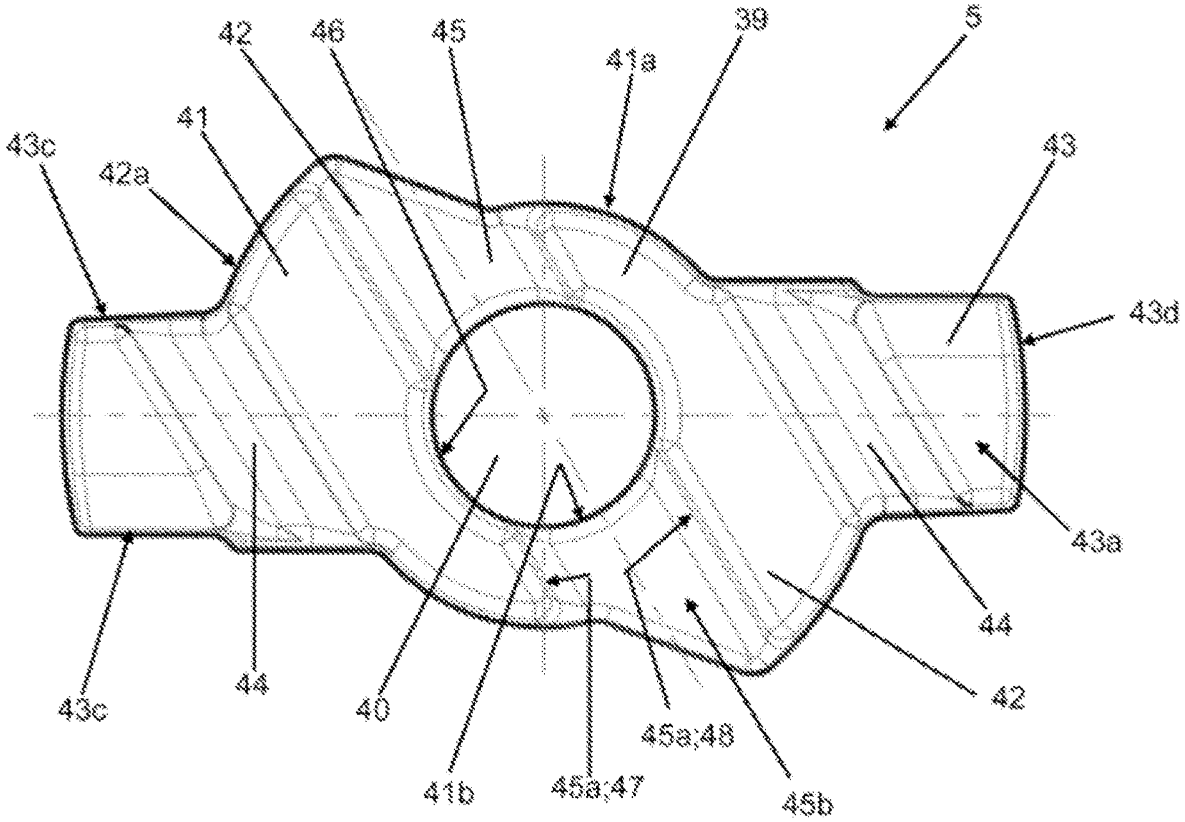
FIG. 15: A top view of the latch.

In particular, the two latch locking strips 43 are rotated until they are aligned with the guide slots 15 of the pushbutton housing 2 and with the second guide slots 31 of the actuation knob 3. In particular, the latch 5 can be rotated until the stops 42 again rest against the connecting webs 22 of the actuation knob 3 (FIG. 9). Thus, the connecting webs 22 also act as abutments for the movement of the latch 5 into the pushbutton unlocking direction 61. The latch 5 can be rotated back and forth between the connecting webs 22. The spiral compression spring 6 is thereby tensioned since the spring wire ends 59*a*;59*b* are pushed apart, or rather the spring wire end 59*a* is rotated about the spring axis opposite to the spring torque.

The actuation knob 3 is now in the unlocked, but still unactuated state. The movement of the actuation knob 3 in the pushbutton actuation direction 60 is thus no longer blocked. Now the actuation knob 3 can be pressed into the pushbutton housing 2 in the pushbutton actuation direction 60, that is to say actuated.

If the actuation knob 3 is actuated by the operator in that it is pressed into the pushbutton housing 2 in the pushbutton actuation direction 60, it will also bring along the latch 5. Here, the latch locking strips 43 of the latch 5 are inserted into the guide slots 15 and are guided therein in the axial direction. Thus, the latch 5 can no longer be rotated about the actuation axis 8 relative to the actuation knob 3 and to the pushbutton housing 2. This therefore also applies to the cylinder lock core 4. The operator therefore no longer needs to apply any force onto the key in the unlocking direction 61 in order to prevent a rotation opposite to the unlocking direction 61.

When pressing in the actuation knob 3, that is to say during the actuation stroke, the spiral compression spring 6 is also compressed and thereby tensioned.

Figure 7:
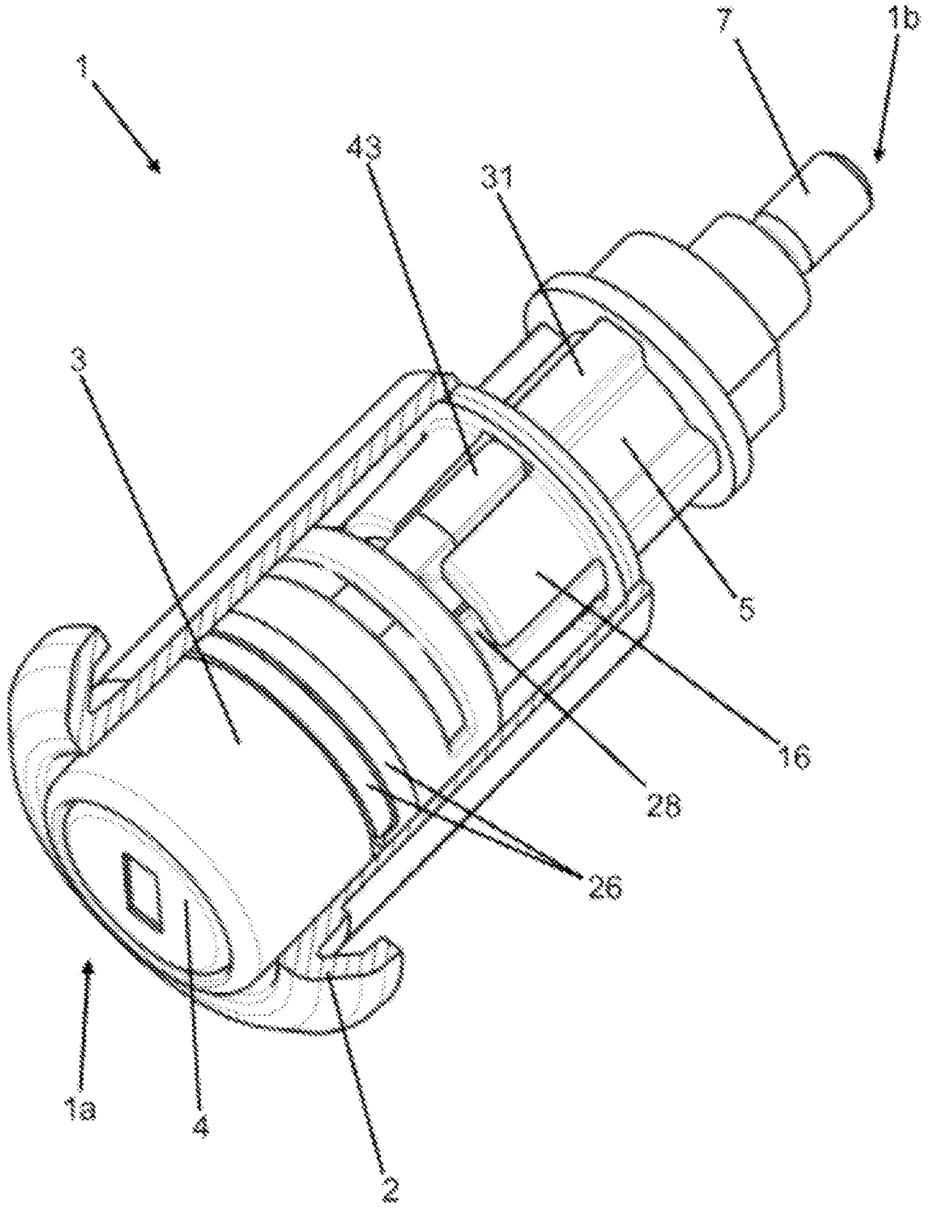
FIG. 7: An additional perspective view of the pushbutton according to the invention in its unlocked and actuated position, with partially cut-away pushbutton housing.

The actuation knob 3 can be pressed in at most until the web bases 28 of the connecting webs 22 abut against the tube segments (FIG. 7).

With the actuation knob 3 the coupling element 7 is also displaced in the direction of the pushbutton actuation direction 60 relative to the pushbutton housing 2. Thus, the actuation mechanism 49 of the lock mechanism is actuated in a manner known per se such that the lock 50 is unlocked (FIG. 16).

Immediately after the operator has released the actuation knob 3, the actuation knob 3 together with the latch 5 is pushed back or moved back opposite the pushbutton actuation direction 60 in a self-actuated manner, in particular due to the force of the spiral compression spring 6. It is thus pushed or driven out of the pushbutton housing 2 again. The latch 5 is hereby taken along.

Since the latch 5 is guided with the latch locking strips 43 within the guide slots 15 of the actuation knob 3, it initially cannot rotate back against the unlocking direction 61 relative to the actuation knob 3 during the return stroke. The same therefore applies to the cylinder lock core 4. Both of them perform a purely linear movement. As a result, however, the key cannot be pulled out of the cylinder lock core 4 either. This is because the platelet tumblers 34 are rotated in a manner known per se relative to the locking grooves of the actuation knob 3 and thus no longer can dodge into them.

As soon as the latch locking strips 43 have moved out from the guide slots 15 of the actuation knob 3, the latch 5 together with the cylinder lock housing 4 rotates opposite the unlocking direction 61 back into its non-actuated, locking initial position.

In this position, the key can then be withdrawn by the operator since the platelet tumblers 34, driven by the springs 36, can move into the locking grooves of the actuation knob 3 in a manner known per se. After pulling out the key, the cylinder lock core 4 again is non-rotatably connected to the actuation knob 3. Thus, the cylinder lock core 4 is locked or the actuation knob or the pushbutton 1 are not unlockable or locked up or locked.

Thus, the pushbutton 1 is again in its locked and non-unlockable or locked up initial position and can only be unlocked anew and then actuated by insertion of a corresponding key.

The pushbutton 1 according to the invention ensures a high degree of protection against opening of the vehicle door, hood or hatch by unauthorized persons. Because the pushbutton 1 locks after the return stroke of the actuation knob 3 in a self-actuated manner, that is, without actuation by means of the key, the key does not have to be turned. This is done automatically and purely mechanically, preferably by spring forces. Especially in the case of vehicle hoods, in particular engine hoods and vehicle hatches, this is an important safety factor to avoid accidents. The key merely has to be removed so that the unlocking of the pushbutton 1 is blocked.

It is also particularly advantageous that the key cannot be withdrawn either during the actuation stroke or during the return stroke, since the cylinder lock core 4 cannot rotate relative to the actuation knob 3 either during the actuation stroke or during the return stroke. This is an additional safety function. Because if the pushbutton 1 eventually were not to move back into the non-actuated and unlocked position in a self-actuated manner due to contamination inside the pushbutton 1, the key cannot be withdrawn either. And this would be noticed by the operator, so that the operator can manually lock the pushbutton and thus it is ensured that the pushbutton 1 is always locked.

In addition, the assembly of the pushbutton 1 according to the invention is very simple with few components and, consequently, is also functionally very reliable. Furthermore, the pushbutton 1 is low in cost to manufacture and easy to assemble.

While the above description constitutes the preferred embodiment of the present invention, it will be appreciated that the invention is susceptible to modification, variation and change without departing from the proper scope and fair meaning of the accompanying claims.

The invention claimed is:

1. A pushbutton for unlocking a lock of a door, a hood, a covering or a hatch, comprising a) a pushbutton housing, b) an actuation knob seated in the pushbutton housing comprising an actuation knob housing, and having a non-actuated position and an actuated position, c) a latch for locking the actuation knob in the non-actuated position, wherein the actuation knob in an unlocked state can be displaced linearly along an actuation axis in a pushbutton actuation direction from the non-actuated position into the actuated position relative to the pushbutton housing, d) a cylinder lock with a cylinder lock core seated in the actuation knob housing and a corresponding key, e) wherein the actuating knob can only be unlocked when the corresponding key is introduced into the cylinder lock core, f) wherein the pushbutton is designed such that the actuation knob returns back from the actuated position into the non-actuated position in a self-actuated manner and is locked in a self-actuated manner, wherein the key introduced into the cylinder lock core can only be withdrawn in the non-actuated and a locked position of the pushbutton, wherein the pushbutton housing comprises a housing insertion end and a housing actuation end, wherein the pushbutton housing comprises at the housing actuation end a circumferential, ring-shaped housing bottom extending radially inward from a housing wall, wherein the pushbutton housing comprises a short tube which adjoins the housing bottom and protrudes therefrom in the axial direction and extends toward the housing insertion end, wherein the short tube comprises a connected tube end and an opposing free tube end extending in the axial direction, and wherein the short tube comprises multiple guide slots which extend from the free tube end in the axial direction into the short tube and therethrough and through the housing bottom.

2. A door, a hood, a covering or a hatch comprising a lock and a pushbutton for unlocking of the lock according to claim 1.

3. The door, the hood, the covering or the hatch according to claim 2, wherein the door, the hood, the covering or the hatch is a door, a hood, a covering or a hatch of an agricultural vehicle, a tractor, or of a construction machine.

4. The door, the hood, the covering or the hatch according to claim 2, wherein the lock is a rotary latch lock.

5. A pushbutton for unlocking a lock of a door, a hood, a covering or a hatch, comprising a) a pushbutton housing, b) an actuation knob seated in the pushbutton housing comprising an actuation knob housing, and having a non-actuated position and an actuated position, c) a latch for locking the actuation knob in the non-actuated position, wherein the actuation knob in an unlocked state can be displaced linearly along an actuation axis in a pushbutton actuation direction from the non-actuated position into the actuated position relative to the pushbutton housing, d) a cylinder lock with a cylinder lock core seated in the actuation knob housing and a corresponding key, e) wherein the actuating knob can only be unlocked when the corresponding key is introduced into the cylinder lock core, f) wherein the pushbutton is designed such that the actuation knob returns back from the actuated position into the non-actuated position in a self-actuated manner and is locked in a self-actuated manner, wherein the key introduced into the cylinder lock core can only be withdrawn in the non-actuated and a locked position of the pushbutton, wherein the actuation knob comprises the actuation knob housing, a sleeve and two connecting webs which connect the sleeve to the actuating knob housing, wherein the connecting webs each comprise a first, radially outward protruding guide strip extending in the axial direction, wherein the first guide strips each extend up to and along the sleeve and protrude radially outward from a sleeve wall of the sleeve.

6. The pushbutton according to claim 5, wherein the sleeve comprises two second guide strips extending in the axial direction, which extend outward in the radial direction from the sleeve wall.

7. The pushbutton according to claim 6 wherein the pushbutton housing comprises a housing insertion end and a housing actuation end, wherein the pushbutton housing comprises at the housing actuation end a circumferential, ring-shaped housing bottom extending radially inward from a housing wall, and the pushbutton housing comprises a short tube which adjoins the housing bottom and protrudes therefrom in the axial direction and extends toward the housing insertion end, wherein the short tube comprises a connected tube end and an opposing, free tube end extending in the axial direction, and wherein the short tube comprises multiple guide slots which extend from the free tube end in the axial direction into the short tube and therethrough and through the housing bottom, and in the locked position of the pushbutton, the first and the second guide strips of the actuation knob are each arranged within one of the guide slots of the pushbutton housing, so that the actuation knob is connected to the pushbutton housing non-rotatably about the actuation axis.

8. The pushbutton according to claim 6, wherein the second guide strips are arranged oppositely in a radial direction or one second guide strip is each arranged between two first guide strips.

9. A door, a hood, a covering or a hatch comprising a lock and a pushbutton for unlocking of the lock according to claim 5.

10. A pushbutton for unlocking a lock of a door, a hood, a covering or a hatch, comprising a) a pushbutton housing, b) an actuation knob seated in the pushbutton housing comprising an actuation knob housing, and having a non-actuated position and an actuated position, c) a latch for locking the actuation knob in the non-actuated position, wherein the actuation knob in an unlocked state can be displaced linearly along an actuation axis in a pushbutton actuation direction from the non-actuated position into the actuated position relative to the pushbutton housing, d) a cylinder lock with a cylinder lock core seated in the actuation knob housing and a corresponding key, e) wherein the actuating knob can only be unlocked when the corresponding key is introduced into the cylinder lock core, f) wherein the pushbutton is designed such that the actuation knob returns back from the actuated position into the non-actuated position in a self-actuated manner and is locked in a self-actuated manner, wherein the key introduced into the cylinder lock core can only be withdrawn in the non-actuated and a locked position of the pushbutton, wherein the pushbutton comprises the latch for locking of the actuating knob, by means of which the movement of the actuating knob can be locked in the pushbutton actuation direction, wherein the cylinder lock core is non-rotatably connected to the latch about the actuation axis, wherein the latch comprises an actuation segment receiving groove in which an actuation segment of the cylinder lock core is arranged in a positive-locking manner such that the cylinder lock core is connected to the latch non-rotatably about the actuation axis.

11. The pushbutton according to claim 10, wherein the actuation knob can be unlocked by rotation of the latch relative to the actuation knob or relative to the pushbutton housing in an unlocking direction.

12. The pushbutton according to claim 10, wherein the latch comprises multiple latch locking strips extending in the axial direction, which extend outward in the radial direction.

13. The pushbutton according to claim 12, wherein the pushbutton housing comprises a housing insertion end and a housing actuation end, wherein the pushbutton housing comprises at the housing actuation end a circumferential, ring-shaped housing bottom extending radially inward from a housing wall, and the pushbutton housing comprises a short tube which adjoins the housing bottom and protrudes therefrom in the axial direction and extends toward the housing insertion end, wherein the short tube comprises a connected tube end and an opposing free tube end extending in the axial direction, and wherein the short tube comprises multiple guide slots which extend from the free tube end in the axial direction into the short tube and therethrough and through the housing bottom, and the actuation knob comprises the tubular actuation knob housing, a sleeve and two connecting webs which connect the sleeve to the actuating knob housing, wherein the connecting webs are arranged in a radially opposing manner, and the connecting webs each comprise a first, radially outward protruding guide strip extending in the axial direction, wherein the first guide strips each extend up to and along the sleeve and protrude radially outward from a sleeve wall of the sleeve, and the sleeve comprises two second guide strips extending in the axial direction, which extend outward in the radial direction from the sleeve wall, wherein the second guide strips are arranged oppositely in a radial direction or wherein one second guide strip is each arranged between two first guide strips, and the latch in the locked position of the pushbutton is rotated with respect to the sleeve such that the latch locking strips are rotated with respect to the second guide strips of the sleeve, and the latch locking strips are not arranged in alignment with the guide slots in the axial direction, but rest against a short tube wall front surface of the short tube, so that the movement of the actuating knob is blocked in the pushbutton actuation direction.

14. The pushbutton according to claim 12, wherein the pushbutton housing comprises a housing insertion end and a housing actuation end, wherein the pushbutton housing comprises at the housing actuation end a circumferential, ring-shaped housing bottom extending radially inward from a housing wall, and the pushbutton housing comprises a short tube which adjoins the housing bottom and protrudes therefrom in the axial direction and extends toward the housing insertion end, wherein the short tube comprises a connected tube end and an opposing free tube end extending in the axial direction, and wherein the short tube comprises multiple guide slots which extend from the free tube end in the axial direction into the short tube and therethrough and through the housing bottom, and the actuation knob comprises the tubular actuation knob housing, a sleeve and two connecting webs which connect the sleeve to the actuating knob housing, wherein the connecting webs are arranged in a radially opposing manner, and the connecting webs each comprise a first radially outward protruding guide strip extending in the axial direction, wherein the guide strips each extend up to and along the sleeve and protrude radially outward from a sleeve wall of the sleeve, and the sleeve comprises two second guide strips extending in the axial direction, which extend outward in the radial direction from the sleeve wall, wherein the second guide strips are arranged oppositely in a radial direction and/or wherein one second guide strip is each arranged between two first guide strips, and in the unlocked state of the pushbutton, the two latch locking strips are arranged in the axial direction to align with the guide slots of the pushbutton housing or are arranged in the axial direction to align with the second guide strips of the actuating knob.

15. The pushbutton according to claim 12 wherein the pushbutton housing comprises a housing insertion end and a housing actuation end, wherein the pushbutton housing comprises at the housing actuation end a circumferential, ring-shaped housing bottom extending radially inward from a housing wall, and the pushbutton housing comprises a short tube which adjoins the housing bottom and protrudes therefrom in the axial direction and extends toward the housing insertion end, wherein the short tube comprises a connected tube end and an opposing free tube end extending in the axial direction, and wherein the short tube comprises multiple guide slots which extend from the free tube end in the axial direction into the short tube and therethrough and through the housing bottom, and the two latch locking strips in the non-actuated position of the actuation knob are arranged outside of the guide slots of the pushbutton housing, so that the latch and the cylinder lock core with inserted key can be rotated around the actuation axis relative to the actuation knob and to the pushbutton housing.

16. The pushbutton according to claim 12, wherein the pushbutton housing comprises a housing insertion end and a housing actuation end, wherein the pushbutton housing comprises at the housing actuation end a circumferential ring-shaped housing bottom extending radially inward from a housing wall, and the pushbutton housing comprises a short tube which adjoins the housing bottom and protrudes therefrom in the axial direction and extends toward the housing insertion end, wherein the short tube comprises a connected tube end and an opposing free tube end extending in the axial direction, and wherein the short tube comprises multiple guide slots which extend from the free tube end in the axial direction into the short tube and therethrough and through the housing bottom, and the two latch locking strips in the unlocked state of the pushbutton and during the actuation stroke and during the return stroke are arranged within the guide slots of the pushbutton housing, so that the latch and the cylinder lock core cannot be rotated around the actuation axis relative to the actuation knob and relative to the pushbutton housing.

17. The pushbutton according to claim 12 wherein the pushbutton housing comprises a housing insertion end and a housing actuation end, wherein the pushbutton housing comprises at the housing actuation end a circumferential ring-shaped housing bottom extending radially inward from a housing wall, and the pushbutton housing comprises a short tube which adjoins the housing bottom and protrudes therefrom in the axial direction and extends toward the housing insertion end, wherein the short tube comprises a connected tube end and an opposing free tube end extending in the axial direction, and wherein the short tube comprises multiple guide slots which extend from the free tube end in the axial direction into the short tube and therethrough and through the housing bottom, and the latch can be driven by rotation of the cylinder lock core in an unlocking direction relative to the pushbutton housing such that the locking strips are aligned with the guide slots in the axial direction.

18. The pushbutton according to claim 12 wherein the pushbutton housing comprises a housing insertion end and a housing actuation end, wherein the pushbutton housing comprises at the housing actuation end a circumferential ring-shaped housing bottom extending radially inward from a housing wall, and the pushbutton housing comprises a short tube which adjoins the housing bottom and protrudes therefrom in the axial direction and extends toward the housing insertion end, wherein the short tube comprises a connected tube end and an opposing free tube end extending in the axial direction, and wherein the short tube comprises multiple guide slots which extend from the free tube end in the axial direction into the short tube and therethrough and through the housing bottom, and the pushbutton is designed such that the latch locking strips move out from the guide slots by displacement of the actuation knob from the actuated position into the non-actuated position.

19. The pushbutton according to claim 18, wherein the pushbutton is designed such that the latch and the cylinder lock core after extension of the latch locking strips from the guide slots move back in a self-actuated manner opposite an unlocking direction into their starting position in which the actuation knob is locked.

20. The pushbutton according to claim 19, wherein the pushbutton is designed such that the latch and the cylinder lock core after extension of the latch locking strips from the guide slots move back in a self-actuated manner, driven by a spring force, opposite an unlocking direction into their starting position in which the actuation knob is locked.

21. The pushbutton according to claim 12, wherein the latch comprises two latch locking strips, which are opposite each other in the radial direction.

22. The pushbutton according to claim 10, wherein the pushbutton comprises at least one spring with which the actuation knob is drivably connected relative to the pushbutton housing against the pushbutton actuation direction or with which the cylinder lock core is drivably connected against an unlocking direction, and the latch comprises at least one spring receiving groove in which the spring is supported with a first spring end.

23. The pushbutton according to claim 10, wherein the actuation knob comprises the tubular actuation knob housing, a sleeve and two connecting webs which connect the sleeve to the actuating knob housing.

24. The pushbutton according to claim 10, wherein the pushbutton comprises at least one spring with which the actuation knob is drivably connected relative to the pushbutton housing against the pushbutton actuation direction or with which the cylinder lock core is drivably connected against an unlocking direction, and the latch and via it the cylinder lock core is drivably connected with the spring opposite the unlocking direction relative to the pushbutton housing or relative to the actuating knob.

25. The pushbutton according to claim 10, wherein in the locked and not unlockable state of the pushbutton, the cylinder lock core, the actuating knob, the latch and the pushbutton housing cannot be rotated about the actuation axis with respect to each other.

26. The pushbutton according to claim 10, wherein the connecting webs are arranged in a radially opposing manner, and the latch viewed in the axial direction is arranged between the actuating knob housing and the sleeve, and viewed in the radial direction is arranged between the two connecting webs.

27. A door, a hood, a covering or a hatch comprising a lock and a pushbutton for unlocking of the lock according to claim 10.

28. A push button for unlocking a lock of a door, a hood, a covering or a hatch, comprising a) a pushbutton housing, b) an actuation knob seated in the pushbutton housing comprising an actuation knob housing, and having a non-actuated position and an actuated position, c) a latch for locking the actuation knob in the non-actuated position, wherein the actuation knob in an unlocked state can be displaced linearly along an actuation axis in a pushbutton actuation direction from the non-actuated position into the actuated position relative to the pushbutton housing, d) a cylinder lock with a cylinder lock core seated in the actuation knob housing and a corresponding key, e) wherein the actuating knob can only be unlocked when the corresponding key is introduced into the cylinder lock core, f) wherein the pushbutton is designed such that the actuation knob returns back from the actuated position into the non-actuated position in a self-actuated manner and is locked in a self-actuated manner, wherein the key introduced into the cylinder lock core can only be withdrawn in the non-actuated and a locked position of the pushbutton, wherein the key cannot be withdrawn either during an actuation stroke or during a return stroke, in that the cylinder lock core cannot be rotated relative to the actuation knob during the actuation stroke and during the return stroke.

29. The pushbutton according to claim 28, wherein the pushbutton is designed such that the actuation knob returns from the actuated position into the non-actuated position driven by a spring force and is locked, driven by a spring force.

30. The pushbutton according to claim 28, wherein the cylinder lock core is connected to the actuation knob housing in a manner so as not to rotate about the actuation axis, as long as the key is not introduced into the cylinder lock core, and wherein the cylinder lock core after introduction of the corresponding key can be rotated about the actuation axis relative to the actuation knob housing in an unlocking direction, and the actuation knob can be unlocked by rotation of the cylinder core relative to the actuation knob housing into the unlocking direction.

31. The pushbutton according to claim 28, wherein the actuation knob in the locked position is immovably connected to the pushbutton housing parallel to the actuation axis.

32. The pushbutton according to 28, wherein the actuation knob is connected to the pushbutton housing non-rotatably about the actuation axis.

33. The pushbutton according to claim 28, wherein the pushbutton comprises at least one spring with which the actuation knob is drivably connected relative to the pushbutton housing against the pushbutton actuation direction or with which the cylinder lock core is drivably connected against an unlocking direction.

34. The pushbutton according to claim 28, wherein the cylinder lock core is seated in the actuation knob housing in the direction of the actuation axis in a non-displaceable manner.

35. The pushbutton according to claim 28, wherein the pushbutton is designed such that the cylinder lock core returns from its unlocked position into its starting position in a self-actuated manner.

36. The pushbutton according to claim 35, wherein the pushbutton is designed such that the cylinder lock core returns from its unlocked position into its starting position in a self-actuated manner due to a spring force.

37. The pushbutton according to claim 28, wherein the pushbutton is a pushbutton for unlocking a lock of a door, a hood, a covering or a hatch of an agricultural vehicle, a tractor, or of a construction machine.

38. A door, a hood, a covering or a hatch comprising a lock and a pushbutton for unlocking of the lock according to claim 28.

* * * * *